(12) United States Patent
Li et al.

(10) Patent No.: US 9,869,173 B2
(45) Date of Patent: Jan. 16, 2018

(54) PULSE GENERATION FOR DOWNHOLE LOGGING

(71) Applicant: Halliburton Energy Services, Inc., Houston, TX (US)

(72) Inventors: Peng Li, Houston, TX (US); Batakrishna Mandal, Missouri City, TX (US); Boguslaw Wiecek, Kingwood, TX (US); Zheng Chen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/516,955

(22) PCT Filed: Apr. 28, 2016

(86) PCT No.: PCT/US2016/029722
§ 371 (c)(1),
(2) Date: Apr. 5, 2017

(87) PCT Pub. No.: WO2016/191024
PCT Pub. Date: Dec. 1, 2016

(65) Prior Publication Data
US 2017/0292364 A1    Oct. 12, 2017

Related U.S. Application Data

(60) Provisional application No. 62/165,623, filed on May 22, 2015.

(51) Int. Cl.
*E21B 47/08* (2012.01)
*E21B 44/00* (2006.01)
(Continued)

(52) U.S. Cl.
CPC .......... *E21B 47/082* (2013.01); *E21B 44/005* (2013.01); *G01V 1/50* (2013.01);
(Continued)

(58) Field of Classification Search
CPC ....... E21B 47/082; E21B 44/005; G01V 1/50; G01V 1/52; G01V 2210/10; G01V 2210/12
See application file for complete search history.

(56) References Cited

U.S. PATENT DOCUMENTS 4,283,953 A * 8/1981 Plona ............... G01N 29/11
367/86
4,450,540 A    5/1984 Mallett
(Continued)

OTHER PUBLICATIONS

International Search Report and Written Opinion issued in related PCT Application No. PCT/US2016/029722 dated Aug. 9, 2016, 9 pages.

*Primary Examiner* — Hai Phan
*Assistant Examiner* — Franklin Balseca
(74) *Attorney, Agent, or Firm* — Benjamin Fite; Baker Botts L.L.P.

(57) ABSTRACT

An example method includes determining a frequency response of a tuned pulse to be transmitted from a transmission element. A matching frequency envelope corresponding to a frequency envelope of the frequency response may be determined. A time domain signal corresponding to the matching frequency envelope may be determined. A series of digital pulses corresponding to the time domain signal may be determined. An analog output at a switching amplifier corresponding to the series of digital pulses may be generated. A transmission element may be excited with the analog output.

20 Claims, 7 Drawing Sheets

(51) Int. Cl.
*G01V 1/50* (2006.01)
*G01V 1/52* (2006.01)

(52) U.S. Cl.
CPC ............ *G01V 1/52* (2013.01); *G01V 2210/10* (2013.01); *G01V 2210/12* (2013.01)

(56) References Cited

U.S. PATENT DOCUMENTS

| | | |
|---|---|---|
| 4,897,646 A | 1/1990 | Goodwill et al. |
| 5,636,179 A | 6/1997 | Slomka |
| 5,833,614 A * | 11/1998 | Dodd .................. G01S 7/52038 600/447 |
| 5,852,262 A | 12/1998 | Gill et al. |
| 7,656,747 B2 | 2/2010 | Mandal et al. |
| 8,576,660 B2 | 11/2013 | Mandal et al. |
| 2012/0033528 A1 | 2/2012 | Zhao et al. |

\* cited by examiner

PULSE GENERATION FOR DOWNHOLE LOGGING

CROSS-REFERENCE TO RELATED APPLICATION

The present application is a U.S. National Stage Application of International Application No. PCT/US2016/029722 filed Apr. 28, 2016 which claims priority to U.S. Provisional Patent Application No. 62/165,623 filed May 22, 2015, both of which are incorporated herein by reference in their entirety for all purposes.

The present disclosure relates generally to well drilling and completion operations and, more particularly, to improved pulse generation for downhole logging.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Well drilling and completion operations require information on downhole characteristics to aide in decision making processes. Numerous measurement techniques are used, including logging while drilling (LWD), measuring while drilling (MWD), and wireline logging. One example logging technique uses high power pulse excitations from and echo/reflection detections at a downhole tool to obtain well and reservoir information. These excitations can be difficult, however, due to space and power limitations of typical downhole logging tools. The power limitations may become even more problematic in the presence of highly attenuative fluids, such as drilling mud used in deep-water or managed pressure drilling applications, where the power must be increased to ensure that the excited pulse has sufficient energy to generate an echo/reflection that can be measured by the tool.

FIGURES

Some specific exemplary embodiments of the disclosure may be understood by referring, in part, to the following description and the accompanying drawings.

Figure 1:
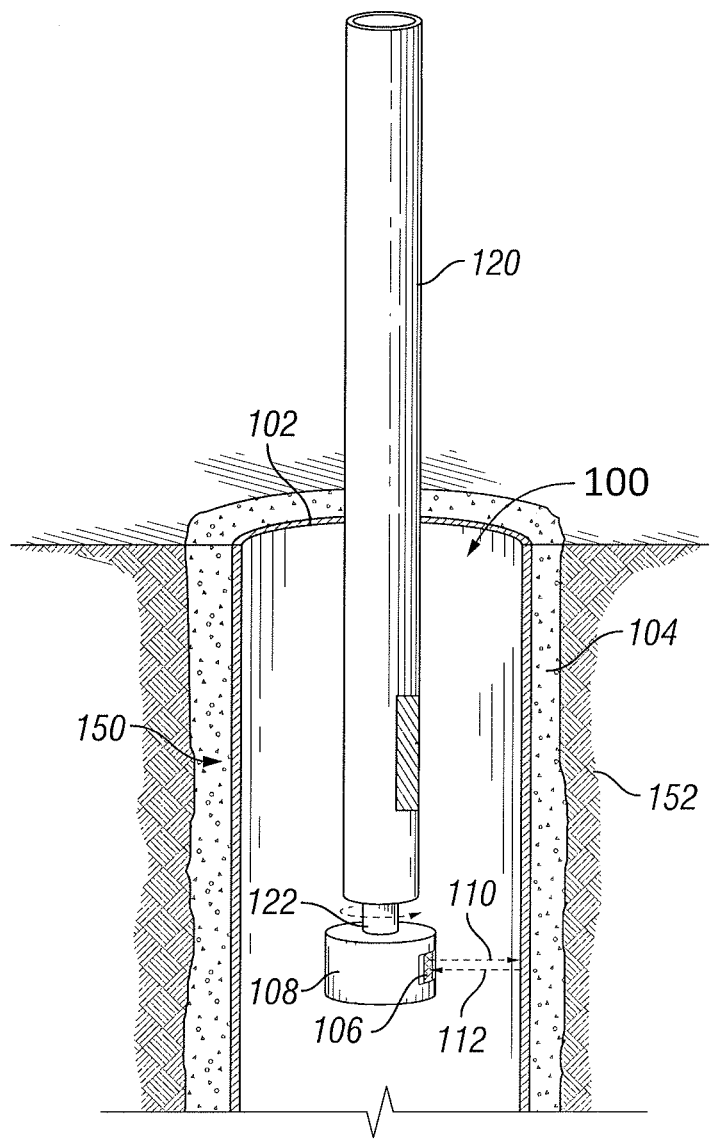
FIG. 1 is a diagram illustrating an example acoustic logging tool, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling and completion operations and, more particularly, to improved pulse generation for downhole logging.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

According to aspects of the present disclosure, pulse generation from downhole logging tools may be improved through the generation and transmission of tuned pulses. These tuned pulses may be shaped and otherwise optimized for certain frequencies and other response characteristics downhole. The tuned pulses may provide better echo responses, particularly in highly attenuative fluids, without the large power increase that would be necessary to receive a similar echo response from a broadband excitation. Although the tuned pulses are described below with respect to a wireline acoustic logging tool with ultrasonic pulses, it should be appreciated that the generation and transmission of tuned pulses described herein are equally applicable to other pulse generation applications, including, but not limited to, electromagnetic excitations, LWD/MWD tools, etc.

FIG. 1 is a diagram illustrating an example acoustic logging tool 100, according to aspects of the present disclosure. The tool 100 may be suspended (e.g. via wireline, slickline, coiled tubing, drill pipe/tubing, downhole tractor, or the like) within a wellbore 150 in a subterranean formation 152. As depicted, the tool 100 may be positioned within a casing 102 that is secured in the wellbore 150 by a cement layer 104 that substantially fills the annulus between the casing 102 and the wellbore 150. The casing 102 may comprise a metal tubular with a pre-determined length and diameter that is specifically selected for a particular depth in the formation 152. Although only one casing 102 is shown in FIG. 1, multiple casings may be used, including in a telescopic orientation where casings with progressively smaller diameters are used as the wellbore 150 extends further into the formation 152. The casing 112 may prevent the wellbore 150 from collapsing, prevent sensitive formation strata from exposure to downhole fluids, and prevent unwanted formation fluids from entering the wellbore 150. This embodiment is referred to a "cased" hole. The tool may also be positioned within an "open" hole, which may comprise the wellbore 150 without the casing 102 or the cement layer 104.

The tool 100 comprises an elongated tool body 120 comprising a rotating portion 108 with a single acoustic transducer 106 coupled thereto. Example acoustic transducers include, but are not limited to, piezoelectric crystals, geophones, electromagnetic elements, etc. As depicted, the rotating portion 108 comprises a rotating head positioned at a distal end of the elongated tool body 120. In other embodiments, the rotation portion 108 may be positioned at one or more intermediate portions of the elongated tool body 120, which may provide greater flexibility with respect to the tool design. As depicted, the diameter of the rotating portion 108 is larger than the diameter of the elongated tool body 120, but other configurations are possible within the scope of the present disclosure.

The rotating portion 108 may be driven by an electric motor (not shown) through a drive shaft 122 or another suitable drive mechanism that provides for the controlled rotational movement of the rotating portion 108 with respect to the tool 100. As depicted, the rotating portions 108 may be driven through a shaft connecting the rotating portion 108 to a drive mechanism within the elongated tool body 120. Power for the drive mechanism and other elements within the tool 100 may be provided, for instance, through the means of suspension, or by one or more power sources, e.g., batteries, capacitors, generators, within the tool 100.

In use, the transducer 106 may transmit a directional ultrasonic pulse 110 to the casing 102 at a first azimuthal location. The directional acoustic pulse 110 may be characterized by a peak amplitude. The directional acoustic pulse 110 is not limited with respect to frequency and can but is not required to be an ultrasonic pulse. The pulse 110 may contact, be reflected by, and/or cause to reverberate the casing 102, the cement layer 104, and the interface between the casing 102 and the cement layer 104. These reflections and reverberations may comprise an echo signal 112 that is received by the transducer 106. In certain instances, one or more pulses may also contact, be reflected by, and/or cause to reverberate the formation 152 and the interface between the cement layer 104 and the formation 152.

After the echo signal 112 is received from the first azimuthal location, the head 108 may be rotated to a second azimuthal location within the wellbore 150. Another pulse may then be transmitted from the transducer 106, and a corresponding echo signal may be received at the transducer 106. The head 108 then may be rotated to a third azimuthal location within the wellbore 150 and yet another pulse may then be transmitted from the transducer 106, and a corresponding echo signal may be received at the transducer 106. The first, second and third azimuthal locations may but are not required to be equal rotational intervals with respect to the tool 100. For instance, the angular difference between the azimuthal locations may be modified in real time depending on the signals received and the granularity of the resulting measurements, with smaller rotational intervals corresponding to a higher granularity.

In certain embodiments, this process may continue unit the head 108 has completed a rotation, at which point the tool 100 may be positioned at a different depth. The group of azimuthal measurements taken at a particular depth may be referred to as a "scan." The number of azimuthal measurements taken to complete a scan may depend, for instance, on the granularity required by the combined measurements as well as downhole conditions. Although not shown, instead of a rotating head, the whole tool or a portion thereof having the transducer 106 can be rotated to accomplish a similar azimuthal scan. For example, if the tool 100 is conveyed into the wellbore 150 via drill pipe, the drill pipe could be rotated to in-turn rotate the tool 100 and thereby the transducer 106.

In certain embodiments, each echo signal received by the transducer 106 may be transmitted to one or more processors or information handling systems (not shown) associated with the tool 100, where it can be processed, for example, to determining physical characteristics (e.g., impedance, thickness, slowness, reflectance) of the casing 102 and cement layer 104. The one or more processors associated with the tool 100 could be, for example, wholly within the tool 100, located at the surface, or a combination of the two (e.g. some processing occurring downhole and some done at the surface.

According to aspects of the present disclosure, the directional acoustic pulse 110 transmitted from the transducer 106 may comprise a tuned pulse generated by a tuned pulse generation system (not shown) within the tool 100 that will be described in detail below. The tuned pulse may comprise a pulse with a predefined time domain shape and frequency response that are selected based, at least in part, on the downhole conditions in which the tool 100 will operate. For example, in an instance where the casing 102 is at least partially filled with a highly attenuative mud 154, the frequency response of the pulse 110 may be set to the resonant frequency of the casing 102. This may improve the amplitude of the echo signal 112 while increasing the power efficiency of the tool 100 by allowing the available power at the tool 100 to be focused in that frequency range, rather than other frequency ranges. In certain instances, increased power efficiency may mean that smaller power supplies may be used in the tool, which may reduce the expense of the tool.

Figure 2:
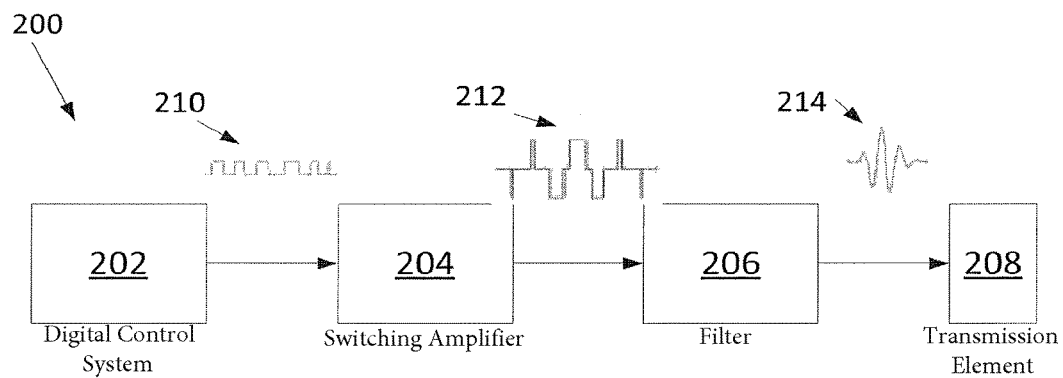
FIG. 2 is a diagram of an example tuned pulse generation system, according to aspects of the present disclosure.

FIG. 2 is a diagram of an example tuned pulse generation system 200, according to aspects of the present disclosure. The pulse generate system 200 may be located within a downhole tool such as the acoustic logging tool described above, or other types of logging tools that would be appreciated by one of ordinary skill in the art in view of this disclosure. In one or more embodiments, the system 200 comprises a digital control system 202 coupled to a switching amplifier 204, that is, in turn, coupled to a transmission element 208, such as a transducer, through a filter 206. As used herein a digital control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), field programmable gate arrays (FPGA), or any other digital or analog circuitry configured to interpret and/or execute program instructions and/or process data. Some or all of the digital control system 202 may be located within the logging tool, at the surface, or a combination of the two.

In use, the control system 202 may generate a series of digital pulses 210 with a frequency response that approximates the frequency response of a desired tuned pulse to be transmitted from the transmission element 208. In certain embodiments, the desired tuned pulse and/or corresponding digital pulses 210 may be calculated at the control system 202, calculated at a remote information handling system (e.g., one located at the surface or a drill site or remote from the drill site) and transmitted to the control system 202, calculated before the control system 202 is deployed and stored within memory in the control system 202, or calculated at some combination thereof. The switching amplifier 204 may receive the digital pulses 210 and generate an output 212 based, at least in part, on the received digital pulses 210. In certain embodiments, the switching amplifier 204 may comprise an H-bridge amplifier, but other types of switching amplifiers can also be used.

The output 212 from the switching amplifier 204 may be received at the filter 206. The filter 206 may comprise a high-pass, low-pass, band-pass, or tunable filter that shapes the output 212 from the switching amplifier 204 into a desired voltage pulse 214. The filter 206 may shape the switching amplifier output 212 by suppressing unwanted sideband frequencies introduced by the switching amplifier 204. In the case of a tunable filter, the filter 206 may be communicably coupled to the control system 202 and receive one or more control signals from the control system 202 regarding the filter characteristics to be applied to the switching amplifier output 212.

The desired voltage pulse 214 shaped by the filter 206 may be received by and drive the transmission element 208. In certain embodiments, the transmission element 208 may both transmit the desired signal and receive echos and reflections of that signal from the wellbore. To accommodate the bi-directional signal movement, a transformer (not shown) may be positioned between the filter 206 and the transmission element 208. Separate receiver circuitry may also be coupled to the transformer. Typical transformers require a time duration to dissipate residual energy. When pulses and echos are received through the transformer within that duration, the transformer may not have sufficient time to dissipate power and may saturate over time. To overcome this limitation and facilitate more frequent pulses/echos, the polarity of each transmitted pulse may be switched from the pulse proceeding it, such that the pulse transmission/echo reception themselves function to reduce the residual power within the transformer to prevent it from saturating.

Figure 3:
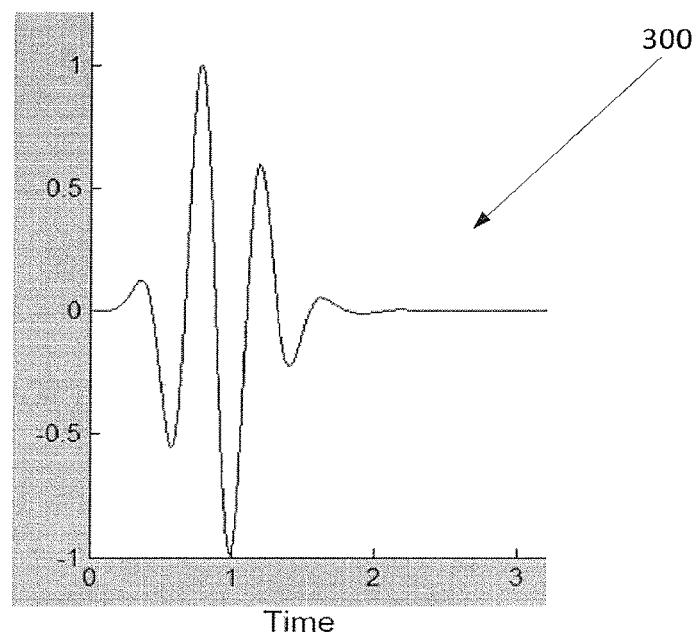
FIG. 3 is a graph of an example desired tuned pulse for which corresponding digital pulses will be generated, according to aspects of the present disclosure.

As described above, a control system of an example tuned pulse generation system may generate a series of digital pulses with a frequency response that approximates the frequency response of a desired tuned pulse to be transmitted from the transmission element. This process may include receiving or otherwise determining the desired tuned pulse to be transmitted. FIG. 3 is a graph of an example desired tuned pulse 300 as a minimum phase wavelet for which corresponding digital pulses will be generated. Minimum phase wavelets may be used as drive pulses for acoustic or electromagnetic tools because they deliver an optimal waveform at the least amount of power. In certain embodiments, the tuned pulse may be pre-determined at the control signal or a remote information handling, or determined at the control system in response to an in-situ determination regarding the signal response of a downhole target, such as a casing or cement layer.

Figure 4:
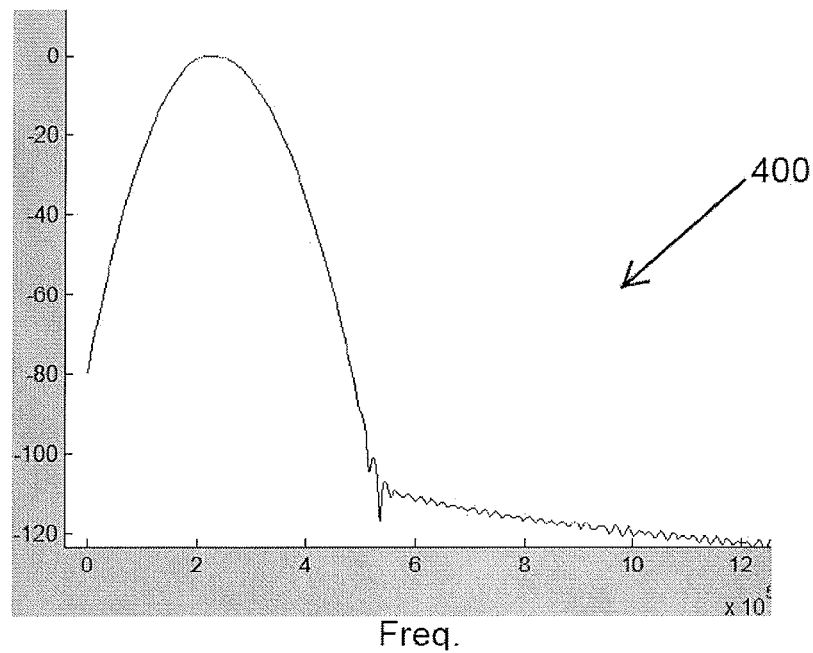
FIG. 4 is a graph illustrating a frequency response of an example desired tuned pulse, according to aspects of the present disclosure.

After the control system has received or otherwise determined the desired pulse, the control system may generate time and frequency domain approximations of the desired pulse. In one or more embodiments, generating time and frequency domain approximations of the desired pulse may include first determining a frequency response of the desired signal. This may include, for instance, various signal transformations, such as Fourier transforms, that may be performed by the control system. FIG. 4 is a graph illustrating the frequency response 400 of the desired tuned pulse 300 in FIG. 3.

Figure 5:
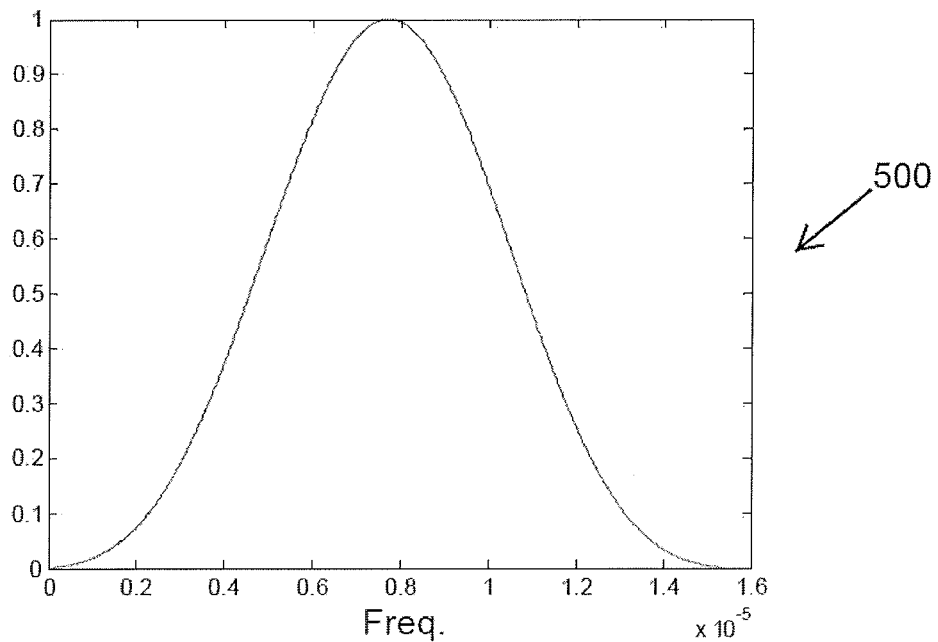
FIG. 5 is a graph illustrating a matching frequency envelope for a frequency response of an example desired tuned pulse, according to aspects of the present disclosure.

After the frequency response 400 of the desired pulse 300 is obtained, the frequency response 400 may be moved from its passband to its base band. This may include removing the carrier wave from the frequency response 400 and determining a frequency envelope for the desired pulse. The control system may then perform one or more matching functions to determine a matching frequency envelope to the frequency envelope of the desired pulse. In certain embodiments, the matching functions may include the use of one or more iterative matching algorithms that iteratively improves a matching signal until a given tolerance or threshold is obtained. FIG. 5 is a graph illustrating an example matching baseband envelope 500 for the passband frequency response of the frequency response in FIG. 4.

Figure 6:
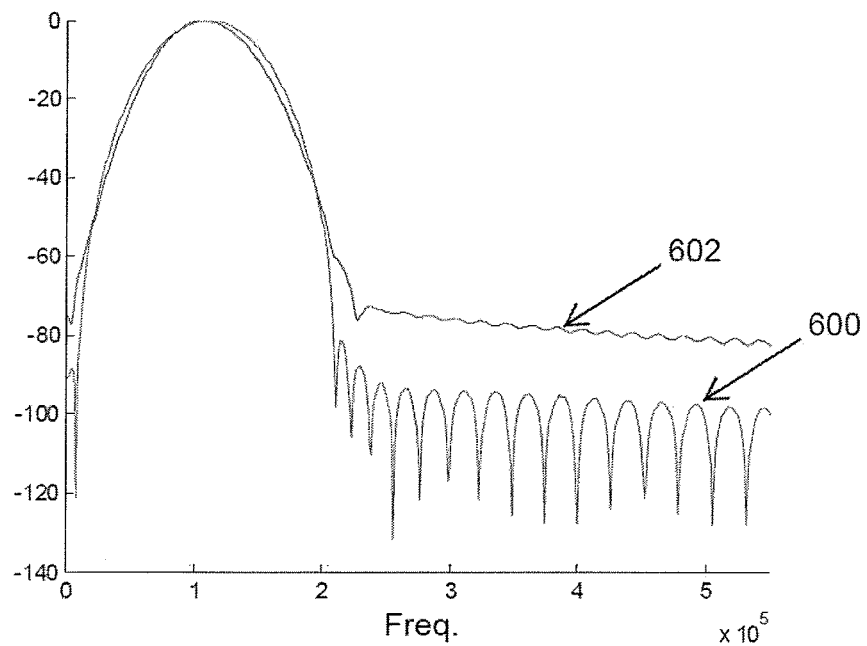
FIG. 6 is a graph illustrating a frequency response of an example approximated desired pulse with respect to a frequency response of an example actual desired pulse, according to aspects of the present disclosure.
Figure 7:
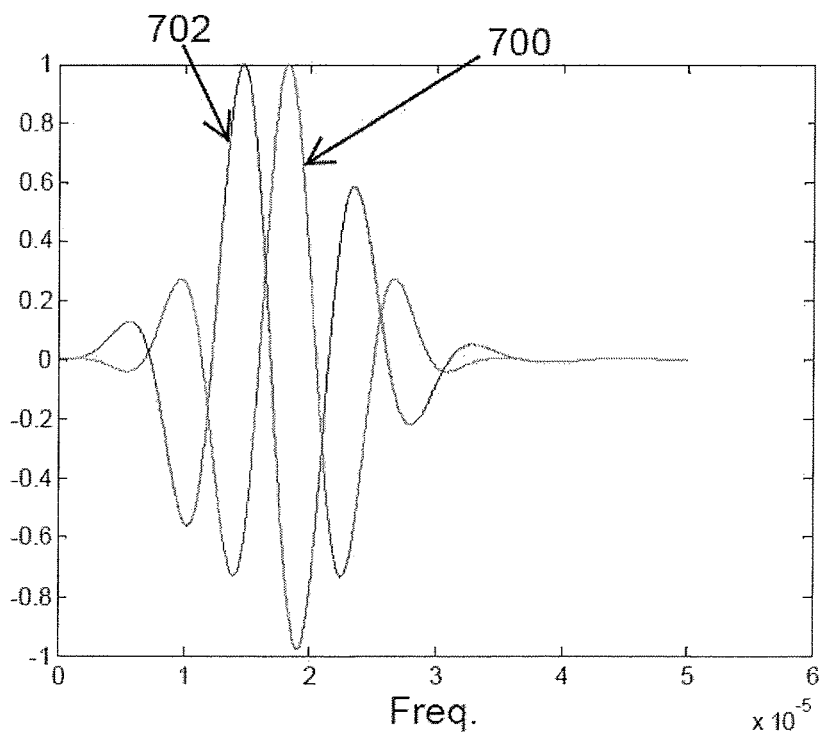
FIG. 7 is a graph illustrating the time domain response of an example approximated desired pulse with respect to a time domain response of an example actual desired pulse, according to aspects of the present disclosure.

In certain embodiments, once the matching frequency envelope 500 is obtained, the control system may generate an approximation of the desired pulse using the matching frequency envelope and an ideal carrier wave at the carrier wave frequency of the desired pulse. FIG. 6 is a graph illustrating the frequency response 600 of the approximated desired pulse with respect to the frequency response 602 of the actual desired pulse. FIG. 7 is a graph illustrating the time domain response 700 of the approximated desired pulse with respect to the time domain response 702 of the actual desired pulse. As can be seen, the frequency response 600 of the approximated signal is very close to the frequency response 602 of the actual signal with the exception of variation in the side bands. As can also be seen, the shape of the signals is very similar in the time domain.

Figure 8:
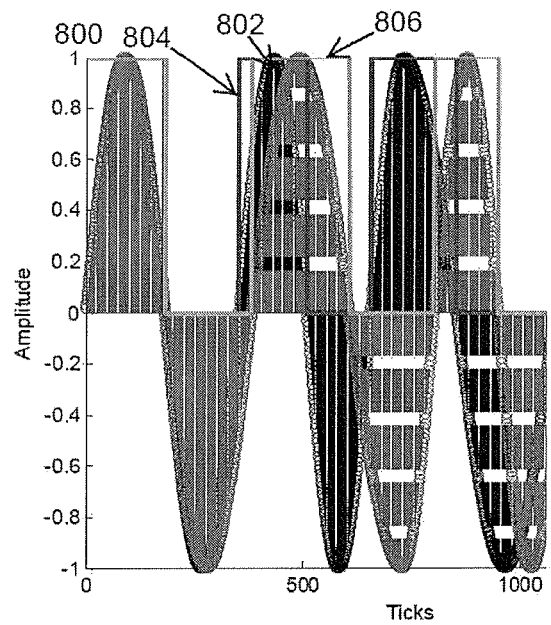
FIG. 8 is a graph illustrating two phase modulated analog waves and two phase modulated digital pulses corresponding to an example approximated desired pulse, according to aspects of the present disclosure.
Figure 9:
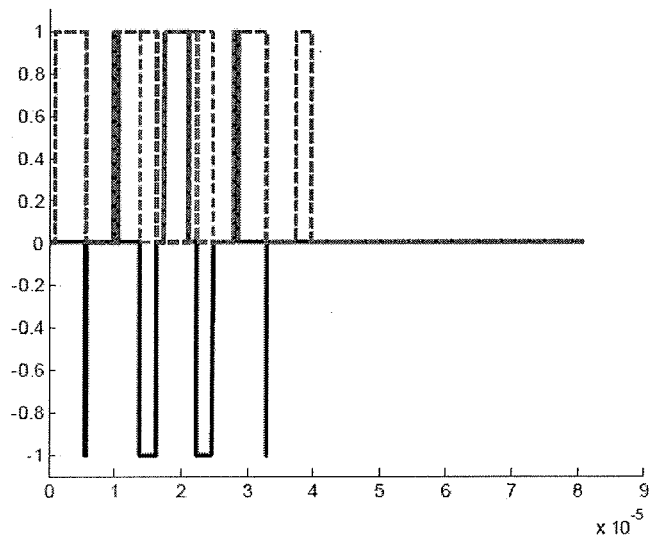
FIG. 9 is a graph illustrating an example output from a switching amplifier in response to two phase modulated digital pulses corresponding to an example approximated desired pulse, according to aspects of the present disclosure.

In certain embodiments, once the approximated signal is obtained by the control system, the control system may generate a series of digital pulses to represent the desired signal. This is done, for instance, with phase modulation. For instance, as can be seen in FIG. 8, two phase modulated waves 800/802 can be used to represent the approximated signal of FIG. 7 in the time domain. The two phase modulate signals may then be transformed into respective square waves 804/806 such that two phase shifted digital pulse are obtained. In certain embodiments, such as when a switching amplifier coupled to the control system comprises an H-bridge, the two phase shifted digital pulses may correspond to positive and negative signals that respectively trigger different legs of the H-bridge, causing it to generate the high voltage output illustrated in FIG. 9.

Figure 10:
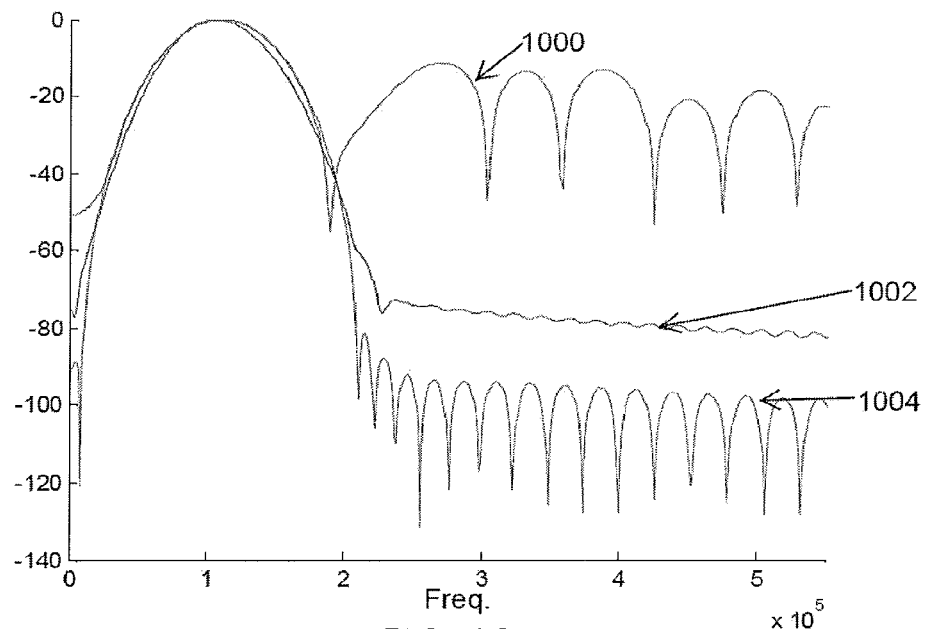
FIG. 10 is a graph illustrating the frequency responses of an example desired pulse, an example approximated desired pulse, and an example analog output corresponding to the approximated desired pulse, according to aspects of the present disclosure.

In certain embodiments, the frequency response of the analog output of the switching amplifier may comprise side band lobes that are added by the switching amplifier itself. FIG. 10 illustrates these side lobes in the frequency response 1000 of the analog output as compared to the frequency responses 1002 and 1004 of the desired and approximated signals. To suppress or eliminate these side lobes, the analog output of the switching amplifier may be filtered. In certain embodiments, the filter may greatly suppress the side lobe and further improve the shape of the approximated signal in the time domain as compared to the desired signal.

Figure 11:
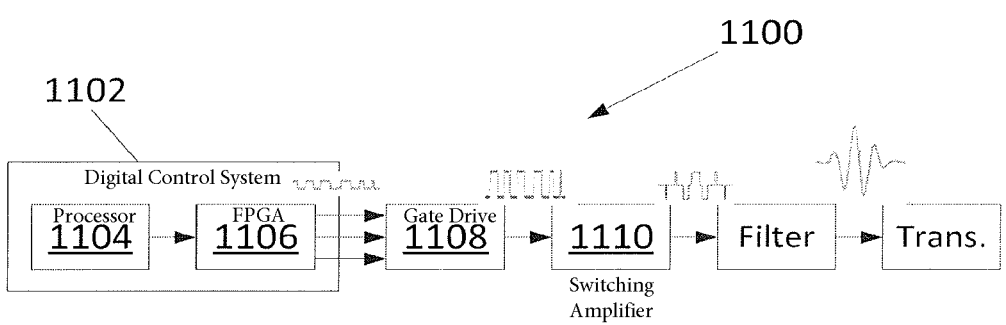
FIG. 11 is a diagram of another example tuned pulse generation system, according to aspects of the present disclosure.

FIG. 11 is a diagram of another tuned pulse generation system 1100, according to aspects of the present disclosure. As depicted, the system 1100 includes a digital control system 1102. The digital control system 1102 comprises a DSP or other processor 1104 and a FPGA 1106. The system 1100 also includes a gate drive 1108 coupled between the FPGA 1106 and a switching amplifier 1110. As depicted, the digital pulse calculation and generation functionality may be segregated between the DSP 1102 and the FPGA 1104. Specifically, the DSP 1102 may be responsible for the pulse calculation and general task management, and the FPGA 1106 may be responsible for switching gate driver 1108 for the real-time pulse generation. In certain embodiments, the FPGA 1106 may be specifically designed for switching functionality. With a FPGA 1106 dedicated to switching and DSP 1102 for the general tasks, the system 1100 can achieve much higher time resolution without sacrifice the data throughput and the system responsive performance, as compared to a system in which the digital pulse calculation and generation functionality is combined into a single DSP or other processing unit.

Figure 12:
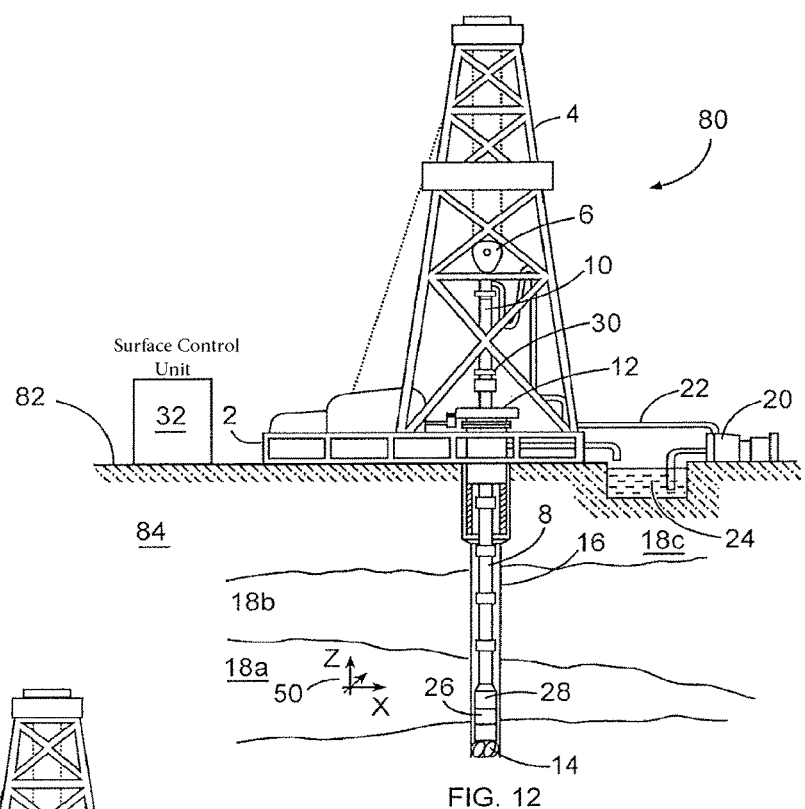
FIG. 12 is a diagram showing an illustrative drilling system, according to aspects of the present disclosure.

One or more of the apparatus, systems, and/or methods described above may be incorporated into/with a wireline tool/sonde for wireline logging operation or into/with one or more LWD/MWD tools for drilling operations. FIG. 12 is a diagram showing a subterranean drilling system 80 incorporating at least one LWD/MWD tool 26, according to aspects of the present disclosure. The drilling system 80 comprises a drilling platform 2 positioned at the surface 82. As depicted, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the tool 26. In one or more embodiments, the tool 26 may comprise acoustic and/or electromagnetic pulse excitation and echo/reflection reception functionality, as described above. As the bit extends the borehole 16 through the formations 18, the tool 26 may collect measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may comprise an information handling system communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84.

Figure 13:
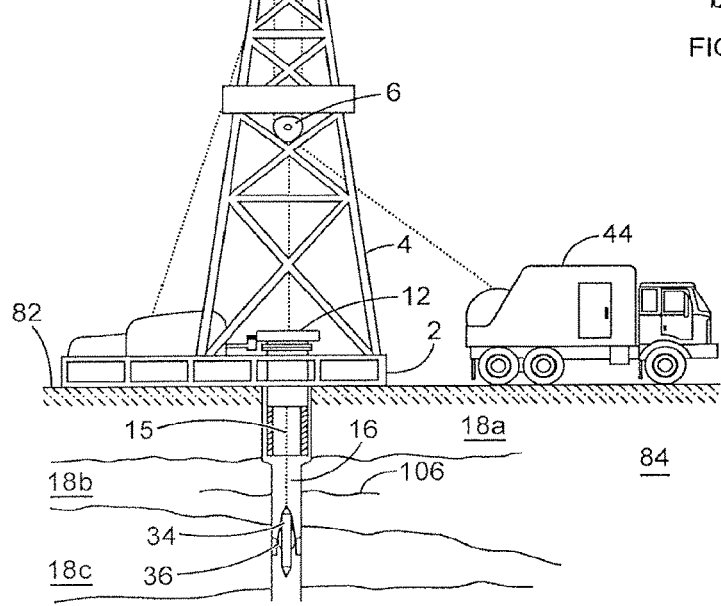
FIG. 13 is a diagram showing an illustrative wireline logging system, according to aspects of the present disclosure.

At various times during the drilling process, the drill string 8 may be removed from the borehole 16 as shown in FIG. 13. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise an acoustic and/or electromagnetic tool 36, similar to the tool 26 described above. The tool 36 may be communicatively coupled to the cable 15. A logging facility 44 (shown in FIG. 13 as a truck, although it may be any other structure) may collect measurements from the acoustic tool 36, and may include computing facilities (including, e.g., a control unit/ information handling system) for controlling, processing, storing, and/or visualizing some or all of the measurements gathered by the tool 36. The computing facilities may be communicatively coupled to the tool 36 by way of the cable 15. In certain embodiments, the control unit 32 may serve as the computing facilities of the logging facility 44.

An example method includes determining a frequency response of a tuned pulse to be transmitted from a transmission element. A matching frequency envelope corresponding to a frequency envelope of the frequency response may be determined. A time domain signal corresponding to the matching frequency envelope may be determined. A series of digital pulses corresponding to the time domain signal may be determined. An analog output at a switching amplifier corresponding to the series of digital pulses may be generated. A transmission element may be excited with the analog output.

In one or more embodiments described in the preceding paragraph, determining the series of digital pulses corresponding to the time domain signal comprises approximating a frequency envelope of the frequency response.

In one or more embodiments described in the preceding two paragraphs, the method includes filtering the switching amplifier output to suppress undesired frequencies in the switching amplifier output.

In one or more embodiments described in the preceding three paragraphs, filtering the switching amplifier output comprises programming a filter band to suppress undesired frequencies in the switching amplifier output.

In one or more embodiments described in the preceding four paragraphs, exciting the transmission element with the filtered analog output comprises exciting the transmission element of a downhole tool positioned in a wellbore in a subterranean operation.

In one or more embodiments described in the preceding five paragraphs, the method includes determining at the downhole tool the tuned pulse to be transmitted.

In one or more embodiments described in the preceding six paragraphs, at least one of the steps of determining the frequency response of the tuned pulse to be transmitted from the transmission element; determining the matching frequency envelope corresponding to the frequency envelope of the frequency response; and determining the time domain signal corresponding to the matching frequency envelope is performed at a processor of the downhole tool.

In one or more embodiments described in the preceding seven paragraphs, the step of determining the series of digital pulses corresponding to the time domain signal is performed at a field programmable gate array coupled to the processor.

In one or more embodiments described in the preceding eight paragraphs, exciting the transmission element with the filtered analog output comprises transmitting the filtered switching amplifier output through a transformer coupled to the transmission element.

In one or more embodiments described in the preceding nine paragraphs, the transmission element comprises a transducer.

An example downhole tool may include a transmission element and a filter coupled to the transmission element. A switching amplifier may be coupled to the filter. A digital control system may be coupled to the switching amplifier, wherein the digital control system is configured to determine a series of digital pulses with a frequency response that approximates the frequency response of a tuned pulse to be transmitted from the transmission element; and output the series of digital pulses to the switching amplifier.

In one or more embodiments described in the preceding paragraph, the filter suppresses undesired frequencies in an output from the switching amplifier.

In one or more embodiments described in the preceding two paragraphs, the filter comprises a programmable filter band; and the digital control system is configured to alter the filter band to suppress undesired frequencies in the output from the switching amplifier.

In one or more embodiments described in the preceding three paragraphs, the filtered output from the switching amplifier excites the transmission element.

In one or more embodiments described in the preceding four paragraphs, the digital control system is further configured to determine at the downhole tool the tuned pulse to be transmitted.

In one or more embodiments described in the preceding five paragraphs, the digital control system is configured to determine the tuned pulse to be transmitted by at least one of calculating the tuned pulse to be transmitted and receiving the tuned pulse to be transmitted.

In one or more embodiments described in the preceding six paragraphs, the digital control system comprises at least one processor coupled to a field programmable gate array.

In one or more embodiments described in the preceding seven paragraphs, the field programmable gate array outputs the series of digital pulses to the switching amplifier.

In one or more embodiments described in the preceding eight paragraphs, a transformer may be coupled between the filter and the transmission element.

In one or more embodiments described in the preceding nine paragraphs, the transmission element comprises a transducer.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. In addition, the systems and methods described herein are not limited to the particular type of transmitters identified and can be adapted to other types of transmitters. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
   determining a frequency response of a tuned pulse to be transmitted from a transmission element;
   determining a matching frequency envelope corresponding to a frequency envelope of the frequency response;
   determining a time domain signal corresponding to the matching frequency envelope;
   determining a series of digital pulses corresponding to the time domain signal;
   generating an analog output at a switching amplifier corresponding to the series of digital pulses; and
   exciting the transmission element with the analog output.

2. The method of claim 1, wherein determining the series of digital pulses corresponding to the time domain signal comprises approximating a frequency envelope of the frequency response.

3. The method of claim 1, further comprising filtering the switching amplifier output to suppress undesired frequencies in the switching amplifier output.

4. The method of claim 3, wherein filtering the switching amplifier output comprises programming a filter band to suppress undesired frequencies in the switching amplifier output.

5. The method of claim 1, wherein exciting the transmission element with the filtered analog output comprises exciting the transmission element of a downhole tool positioned in a wellbore in a subterranean operation.

6. The method of claim 5, further comprises determining at the downhole tool the tuned pulse to be transmitted.

7. The method of claim 5, wherein at least one of the steps of determining the frequency response of the tuned pulse to be transmitted from the transmission element; determining the matching frequency envelope corresponding to the frequency envelope of the frequency response; and determining the time domain signal corresponding to the matching frequency envelope is performed at a processor of the downhole tool.

8. The method of claim 7, wherein the step of determining the series of digital pulses corresponding to the time domain signal is performed at a field programmable gate array coupled to the processor.

9. The method of claim 5, wherein exciting the transmission element with the filtered analog output comprises transmitting the filtered switching amplifier output through a transformer coupled to the transmission element.

10. The method of claim 8, wherein the transmission element comprises a transducer.

11. A downhole tool, comprising:
    a transmission element;
    a filter coupled to the transmission element;
    a switching amplifier coupled to the filter; and
    a digital control system coupled to the switching amplifier, wherein the digital control system is configured to
       determine a frequency response of a tuned pulse to be transmitted from the transmission element;
       determine a matching frequency envelope corresponding to a frequency envelope of the frequency response;
       determine a time domain signal corresponding to the matching frequency envelope;
       determine a series of digital pulses corresponding to the time domain signal;
       generate an analog output at the switching amplifier corresponding to the series of digital pulses; and
       excite the transmission element with the analog output.

12. The tool of claim 11, wherein the filter suppresses undesired frequencies in an output from the switching amplifier.

13. The tool of claim 12, wherein
    the filter comprises a programmable filter band; and
    the digital control system is configured to alter the filter band to suppress undesired frequencies in the output from the switching amplifier.

14. The tool of claim 12, wherein the filtered output from the switching amplifier excites the transmission element.

15. The tool of claim 11, wherein the digital control system is further configured to determine at the downhole tool the tuned pulse to be transmitted.

16. The tool of claim 15, wherein the digital control system is configured to determine the tuned pulse to be transmitted by at least one of calculating the tuned pulse to be transmitted and receiving the tuned pulse to be transmitted.

17. The tool of claim 11, wherein the digital control system comprises at least one processor coupled to a field programmable gate array.

18. The tool of claim 17, wherein the field programmable gate array outputs the series of digital pulses to the switching amplifier.

19. The tool of claim 11, further comprising a transformer coupled between the filter and the transmission element.

20. The tool of claim 11, wherein the transmission element comprises a transducer.

* * * * *